S. N. BLODGETT.
Derricks for Hoisting Cans Containing Fluids.

No. 158,196.          Patented Dec. 29, 1874.

Witnesses
Harry C Clark
H. E. Matthews

Inventor
Saml N. Blodgett
By L. W. Beade &c.
attys.

UNITED STATES PATENT OFFICE.

SAMUEL N. BLODGETT, DECEASED, OF SANDY CREEK, NEW YORK, (PERRY BARTLETT AND MARY BLODGETT, ADMINISTRATORS;) SAID S. N. BLODGETT ASSIGNOR TO HIMSELF AND D. E. WILDS, AND SAID ADMINISTRATORS ASSIGNORS TO THEMSELVES AND DELOS E. WILDS, OF SAME PLACE.

IMPROVEMENT IN DERRICKS FOR HOISTING CANS CONTAINING FLUIDS.

Specification forming part of Letters Patent No. 158,196, dated December 29, 1874; application filed June 18, 1874.

*To all whom it may concern:*

Be it known that I, SAMUEL N. BLODGETT, of Sandy Creek, in the county of Oswego and State of New York, have invented a new and Improved Derrick for Handling Milk; and I do hereby declare that the following is a full and exact description of the same, reference being had to the accompanying drawings and to the letters of reference marked thereon.

This invention is specially designed for use in handling milk at cheese-factories and other places; and consists mainly of a derrick having certain novel features of construction, whereby it is adapted for the peculiar purpose for which it is to be used.

Figure 1:
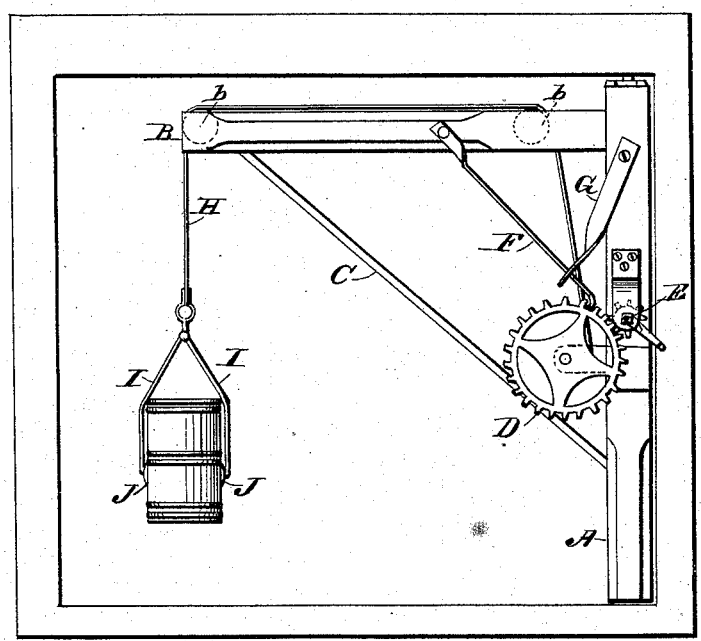
Figure 2:
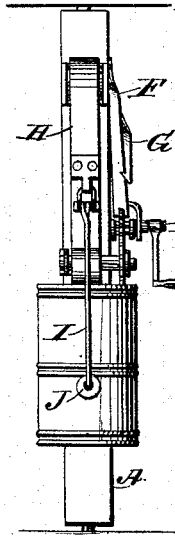

In the drawings, Figure 1 represents a perspective view of my improved derrick, and Fig. 2 a front elevation of the same.

To enable others skilled in the art to make and use my invention, I will now proceed to describe fully its construction.

A represents the derrick-post, which is secured above and below in any proper bearings conveniently located in the building, or any other suitable place. B represents an arm extending at right angles to the post, and rigidly secured thereto, which is further supported in position by means of the brace-rod C, as shown, the latter being so located as to be within convenient reach for use, as a handle to steady and guide the derrick. *b b* represent pulleys located at suitable points, in sockets in the arm B, as shown in dotted lines, Fig. 1. D represents a gear-wheel attached to a suitable shaft, which is hung in ears, or other proper bearings, secured to the post A, which wheel engages with a pinion upon the crank-shaft E, as shown. F represents a spring-dog attached at one end to the arm B, and having its other end adapted to rest upon the teeth of gear-wheel D, and prevent its revolution in a backward direction. G represents a spring-catch adapted to hold securely the dog F, when it is lifted out of contact with the teeth of gear-wheel D. H represents a strap or band securely attached at one end to the shaft of gear-wheel D, and provided at the other with clamps or grapples, by means of which the cans are attached, the main portion of the strap running over the rollers *b b* in the arm B, as shown. I I represent the clamps, which are attached to the band by suitable metal connections, and are provided at their ends with hooks adapted to enter the holes in the projections *j* of the milk-can J, which projections are located below the center of the can, as clearly shown in Figs. 1 and 2.

The operation of my improved derrick is as follows: The belt or strap is wound up to lift cans by means of the crank in the usual manner. The clamps are attached to the cans by means of their hooked ends, which are caught in the openings in the projection J. When it is desired to lower the can, the dog is lifted out of contact with the gear-wheel D, and is held by the spring E. When it is desired to lower the clamps to hook into a can, the crank is removed, and the end of the strap is pulled downward.

The cans being suspended below their centers, are readily dumped and emptied of their contents when the desired point has been reached.

Some of the advantages of the described construction are as follows: The employment of a strap or belt instead of a chain is advantageous, because by means of it the can is kept from revolving, as it is being hoisted. The employment of the brace is advantageous, because it not only furnishes needed support, but because also it affords a ready means of guiding and steadying the derrick.

The entire derrick is simple in its construction, and yet well adapted for the purposes for which it is designed.

Having thus fully described my invention, what I claim as new, and desire to secure by Letters Patent, is—

In a derrick, constructed substantially as described, and provided with the wheel D and pulleys *b b*, a continuous hoisting-strap, H, the strap being adapted to lift fluids in cans, without twisting in the ascent, as described.

This specification signed and witnessed this 7th day of December, 1872.

SAMUEL N. BLODGETT.

Witnesses:
JAY MOUNDS.
HENRY WRIGHT.